United States Patent
Roy et al.

(10) Patent No.: US 7,738,859 B2
(45) Date of Patent: Jun. 15, 2010

(54) MULTI-NODE COMMUNICATION SYSTEM AND METHOD OF REQUESTING, REPORTING AND COLLECTING DESTINATION-NODE-BASED MEASUREMENTS AND ROUTE-BASED MEASUREMENTS

(75) Inventors: Vincent Roy, Montreal (CA); Guang Lu, Montreal (CA); Maged Zaki, Pierrefonds (CA); John L. Tomici, Southold, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 432 days.

(21) Appl. No.: 11/370,626

(22) Filed: Mar. 8, 2006

(65) Prior Publication Data

US 2006/0230238 A1    Oct. 12, 2006

Related U.S. Application Data

(60) Provisional application No. 60/660,403, filed on Mar. 10, 2005.

(51) Int. Cl.
*H04M 3/42*    (2006.01)
(52) U.S. Cl. ............... 455/414.1; 455/432.2; 455/466; 455/411; 455/433; 709/246; 370/259; 370/260
(58) Field of Classification Search ............. 455/414.1, 455/432.2, 466, 411, 433, 436; 709/246; 370/259, 260, 328
See application file for complete search history.

(56) References Cited

U.S. PATENT DOCUMENTS 5,065,399 A * 11/1991 Hasegawa et al. ............... 714/4
5,295,154 A * 3/1994 Meier et al. ................. 370/351
5,590,118 A * 12/1996 Nederlof ...................... 370/218
5,611,047 A * 3/1997 Wakamiya et al. ........... 709/234
5,809,233 A * 9/1998 Shur ........................... 709/230

(Continued)

FOREIGN PATENT DOCUMENTS

WO    04/109472    12/2004

(Continued)

OTHER PUBLICATIONS

IEEE Wireless LAN Edition—A compilation based on IEEE Std. 802.11™—1999 (R2003) and its amendments, Sep. 19, 2003.

(Continued)

*Primary Examiner*—Minh D Dao
(74) *Attorney, Agent, or Firm*—Volpe and Koenig, P.C.

(57) ABSTRACT

A multi-node communication system and method used to request, report and collect destination-node-based measurements and route-based measurements is disclosed. The communication system may be a mesh network including a plurality of mesh points (MPs). In one embodiment, a destination-node-based measurement request is sent to one or more destination nodes via destination-unicast, destination-multicast, or destination-broadcast, using routes specified via next-hop-unicast, next-hop-multicast, or next-hop-broadcast addressing. In another embodiment, a source node sends a measurement request message to a final destination node, whereby each node along the route individually sends a measurement report message to the source node. Alternatively, measurement results of each node are combined and appended to the measurement request message, and a measurement report message including the combined measurement results is sent to the source node.

12 Claims, 6 Drawing Sheets

U.S. PATENT DOCUMENTS

| | | | | |
|---|---|---|---|---|
| 5,884,036 | A * | 3/1999 | Haley | 709/224 |
| 5,933,590 | A * | 8/1999 | Allen | 714/4 |
| 6,023,563 | A * | 2/2000 | Shani | 709/249 |
| 6,044,271 | A | 3/2000 | Findikli | |
| 6,084,867 | A * | 7/2000 | Meier | 370/338 |
| 6,275,470 | B1 | 8/2001 | Ricciulli | |
| 6,426,945 | B1 * | 7/2002 | Sengodan | 370/238 |
| 6,473,405 | B2 | 10/2002 | Ricciulli | |
| 6,584,101 | B2 * | 6/2003 | Hagglund et al. | 370/389 |
| 6,778,502 | B2 | 8/2004 | Ricciulli | |
| 6,934,534 | B1 * | 8/2005 | Roy | 455/414.1 |
| 7,260,645 | B2 * | 8/2007 | Bays | 709/238 |
| 7,342,888 | B2 * | 3/2008 | Sengodan | 370/236 |
| 7,403,492 | B2 * | 7/2008 | Zeng et al. | 370/254 |
| 7,519,033 | B2 | 4/2009 | Soomro | |
| 7,602,843 | B2 | 10/2009 | Cho et al. | |
| 2002/0054596 | A1 * | 5/2002 | Sengodan | 370/395.21 |
| 2002/0110120 | A1 * | 8/2002 | Hagglund et al. | 370/389 |
| 2002/0176370 | A1 * | 11/2002 | Ohba et al. | 370/252 |
| 2003/0128687 | A1 | 7/2003 | Worfolk et al. | |
| 2003/0204619 | A1 * | 10/2003 | Bays | 709/238 |
| 2004/0022194 | A1 | 2/2004 | Ricciulli | |
| 2004/0029553 | A1 | 2/2004 | Cain | |
| 2004/0258064 | A1 * | 12/2004 | Nakamura et al. | 370/389 |
| 2005/0042987 | A1 | 2/2005 | Lee et al. | |
| 2005/0053007 | A1 | 3/2005 | Bernhardt et al. | |
| 2005/0099983 | A1 * | 5/2005 | Nakamura et al. | 370/338 |
| 2006/0114898 | A1 * | 6/2006 | Gorteman et al. | 370/389 |
| 2006/0250999 | A1 * | 11/2006 | Zeng et al. | 370/312 |
| 2008/0002640 | A1 * | 1/2008 | Westphal | 370/338 |
| 2008/0095059 | A1 * | 4/2008 | Chu | 370/238 |

FOREIGN PATENT DOCUMENTS

| | | |
|---|---|---|
| WO | 2004/109472 | 12/2004 |

OTHER PUBLICATIONS

Im, Yongun et al. "A Distributed Multicast Routing Algorithm for Delay-Sensitive Applications;" IEEE; 1999; pp. 1-8.

Srinivasan, Sridhar et al. "M-coop: A Scalable Infrastructure for Network Measurement;" IEEE Computer Society; 2003; Proceedings of the IEEE Workshop; 2003.

Ge, Ye et al. "A Packet Eligible Time Calculation Mechanism for Providing Tempora; QoS for Multicast Routing;" IEEE; 1999; pp. 721-726.

Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking IEEE P802.11s/D0.01, Mar. 2006.

Im, Yongjun et al. "A Distributed Multicast Routing Algorithm for Delay-Sensitive Applications;" IEEE; 1999; pp. 1-8.

Ge, Ye et al. "A Packet Eligible Time Calculation Mechanism for Providing Temporal QoS for Multicast Routing;" IEEE; 1999; pp. 721-726.

802.11 Working Group of the LAN/MAN Committee, "Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking, IEEE P802.11s™/D0.01," Mar. 2006.

IEEE Wireless Lan Edition — A compilation based on IEEE Std. 802.11™—1999 (R2003) and its amendments, Sep. 19, 2003.

Im, Yongun et al. "A Distributed Multicast Routing Algorithm for Delay-Sensitive Applications;" IEEE; 1999; pp. 1-8.

Srinivasan, Sridhar et al. "M-coop: A Scalable Infrastructure for Network Measurement;" IEEE Computer Society; 2003; Proceedings of the IEEE Workshop; 2003.

Ge, Ye et al. "A Packet Eligible Time Calculation Mechanism for Providing Tempora; QoS for Multicast routing;" IEEE; 1999; pp. 721-726.

Draft Amendment to Standard for Information Technology—Telecommunications and Information Exchange Between Systems —LAN/MAN Specific Requirements —Part 11: Wireless Medium Access Control (MAC) and physical layer (PHY) specifications; Amendment: ESS Mesh Networking IEEE P802.11s/D0.01, Mar. 2006.

* cited by examiner

MULTI-NODE COMMUNICATION SYSTEM AND METHOD OF REQUESTING, REPORTING AND COLLECTING DESTINATION-NODE-BASED MEASUREMENTS AND ROUTE-BASED MEASUREMENTS

CROSS REFERENCE TO RELATED APPLICATION

This application claims the benefit of U.S. Provisional Application No. 60/660,403 filed Mar. 10, 2005, which is incorporated by reference as if fully set forth.

FIELD OF INVENTION

The present invention is related to a communication system having a plurality of nodes. More particularly, the present invention relates to requesting, reporting and collecting measurements in a mesh network having a plurality of mesh points (MPs).

BACKGROUND

Typical wireless system infrastructures consist in having a set of access points (APs), also referred to as Base Stations (BSs), each connected to a wired network through what is referred to as a backhaul link. In some scenarios, the cost of connecting a given AP directly to the wired network make it more desirable instead to connect the AP indirectly to the wired network by relaying the information to and from its neighboring APs.

This is referred to as a mesh architecture. In other scenarios, the advantages of using a mesh infrastructure are ease of use and speed of deployment since a radio network can be deployed without having to provision backhaul links and interconnection modules for each AP.

In the context of mesh systems, it is sometimes not sufficient for a node to request measurements from nodes it can directly communicate with. This implies that measurement request frames and measurement report frames will not only need to specify the node to which the frame is sent to but also the node to which the measurement request/report is destined. Also, in a mesh system, because the performance and quality perceived by the users is dependant as much on the conditions of the intermediate hops involved in forwarding the packet than in those of the destination node itself, there is value in collecting measurements from the nodes involved in connecting the source and destination, (i.e., the route), rather than limiting the measurement reporting to only the destination node.

SUMMARY

The present invention is related to a method for use by MPs to request, report and collect destination-node-based measurements. The present invention also includes a method for use by MPs to request, report and collect route-based measurements.

The present invention is related to a method by which MPs request, report and collect destination-node-based measurements. In one embodiment, a destination-node-based measurement request is sent to one or more destination nodes via destination-unicast, destination-multicast, or destination-broadcast, using routes specified via next-hop-unicast, next-hop-multicast, or next-hop-broadcast addressing.

In accordance with the present invention, a plurality of MPs in an MP network request, report and collect multi-hop measurements along single and multiple mesh routes. In this case, the MP requires measurements from all of the nodes up to a specific destination point. The next hop and destination address can be specified as unicast, multicast or broadcast.

The present invention includes several transport mechanisms and options to report measurements. The concepts which can be applied to measurement reporting options include having the measurement request message ask for one or more than one measurement report in a single message.

The concepts which can be applied to measurement reporting options include having the measurement request message ask for measurements once, periodical measurement reporting or threshold based measurement reporting.

The concepts which can be applied to measurement reporting options include having MPs send back a measurement report message or it can piggyback the report on other data, control or management frame. Each node will put together its own measurement in the measurement request message before it forwards it to the next MP up to the final destination node. When the final destination node receives the measurement request message, it will send its own measurements plus all other nodes measurements in the measurement report message.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The preferred embodiments will be described with reference to the drawing figures where like numerals represent like elements throughout.

When referred to hereafter, the terminology "wireless transmit/receive unit" (WTRU) includes but is not limited to a user equipment (UE), a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

The list includes definition of terms that are used in the description of the present invention. The actual full meanings are not limited to the definition:

Destination address: This is the address of the node the packet is ultimately destined to. In the context of measurement support and mechanisms, this refers to the address of the node the measurement request or report is destined to.

Next-hop address: This is the address of the node the packet is sent to during the next available wireless transmission. In the context of measurement support and mechanisms, this refers to the address of the next node which will be receiving the measurement request and that will forward it to the next node involved in the transmission between the two end-nodes, (i.e., source and destination).

Destination-unicast: Refers to a measurement request or report which is destined to a single MP, (including a mesh station (STA) and a mesh AP).

Destination-multicast: Refers to a measurement request or report destined to a multiplicity of MPs, (including a mesh STA and a mesh AP).

Destination-broadcast: Refers to a measurement request or report destined to all MPs within the mesh system, (including a mesh STA and a mesh AP).

Next-hop-unicast: Refers to a frame sent to a single (and most probably preferred) intermediate node as part of the process to convey the packet to the destination node. Using a next-hop-unicast implies that a single route is used in order to transmit the measurement request or report through the mesh network.

Next-hop-multicast: Refers to a frame sent to a multiplicity of intermediate nodes as part of the process to convey the packet to the destination node. Using a next-hop-multicast implies that a multiplicity of routes are used in order to transmit the measurement request or report through the mesh network.

Next-hop-broadcast: Refers to a frame sent to all intermediate nodes that are within reach as part of the process to convey the packet to the destination node. Using a next-hop-broadcast implies that all achievable routes are likely to be probed in order to transmit the measurement request or report through the mesh network.

Mesh measurement request: The fields contained in a mesh measurement request include but are not limited to:

1) source address;

2) destination address, (can be unicast, multicast or broadcast);

3) next-hop address, (can be unicast, multicast or broadcast);

4) maximum number of next-hop addresses, (only applicable in the case of next multicast), for dictating the maximum of different nodes an intermediate MP can forward the mesh measurement request to;

5) requested measurements, (e.g., node address, channel load, or the like);

6) reporting criteria, (e.g., now, periodical, threshold based, or the like);

7) type of measurement, (e.g., node-based, link-based, path-based, or the like);

8) a flag indicating whether the measurement request is destination-node-based or route-based;

9) type of measurement report; and 10) a flag indicating whether the destination node is requested to send one measurement report per transaction, (where a transaction is considered to be a measurement request), or if the destination node should send one measurement report for every version of the measurement request it receives. The latter option, although generating more traffic in the system, may be desirable when the measurement request/report is used to collect the performance associated to multiple routes.

The present invention provides a method for use by MPs to request, report and collect destination-node-based measurements and route-based measurements.

In one embodiment, a destination-node-based measurement request is sent to one or more destination nodes via destination-unicast, destination-multicast, or destination-broadcast, possibly using routes specified via next-hop-unicast, next-hop-multicast, or next-hop-broadcast addressing.

Upon receipt of a measurement request by an intermediate node, the intermediate node will forward the measurement request to the next hop. In the case of next-hop-multicast/broadcast, the intermediate node will decrement a "maximum number of next-hop addresses" value to a new value. The initial value is set by the source MP, (e.g., a configured value). If the decremented value is greater than zero, the intermediate node forwards the measurement request including the new value via next-hop-multicast/broadcast. Otherwise, the intermediate node forwards the measurement request using next-hop-unicast.

Upon receipt of the measurement request by the destination node, the destination node processes the measurement request and sends the specified measurement report back to the source node using the source address specified in the measurement request. Depending on the type of measurement request, the destination node may send one report via one link, or via multiple links from which the measurement request was received.

Upon receipt of the measurement report by any intermediate node, the intermediate node will forward the measurement report to the next-hop. An intermediate node may examine the content of the measurement report passing through it.

Figure 1:
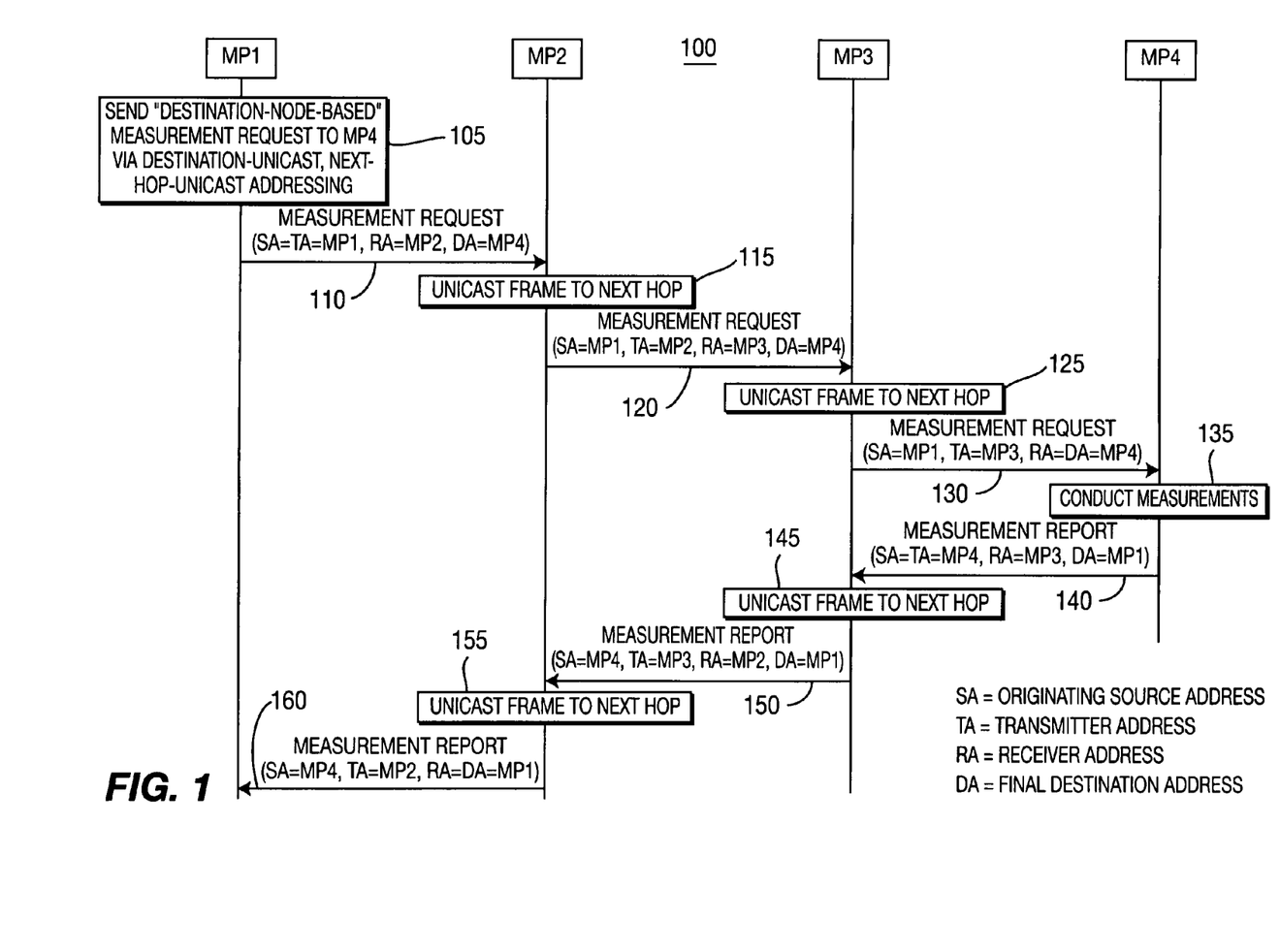
FIG. 1 is a signal flow diagram illustrating the destination-node-based measurements including destination-unicast/next-hop-unicast.
Figure 2:
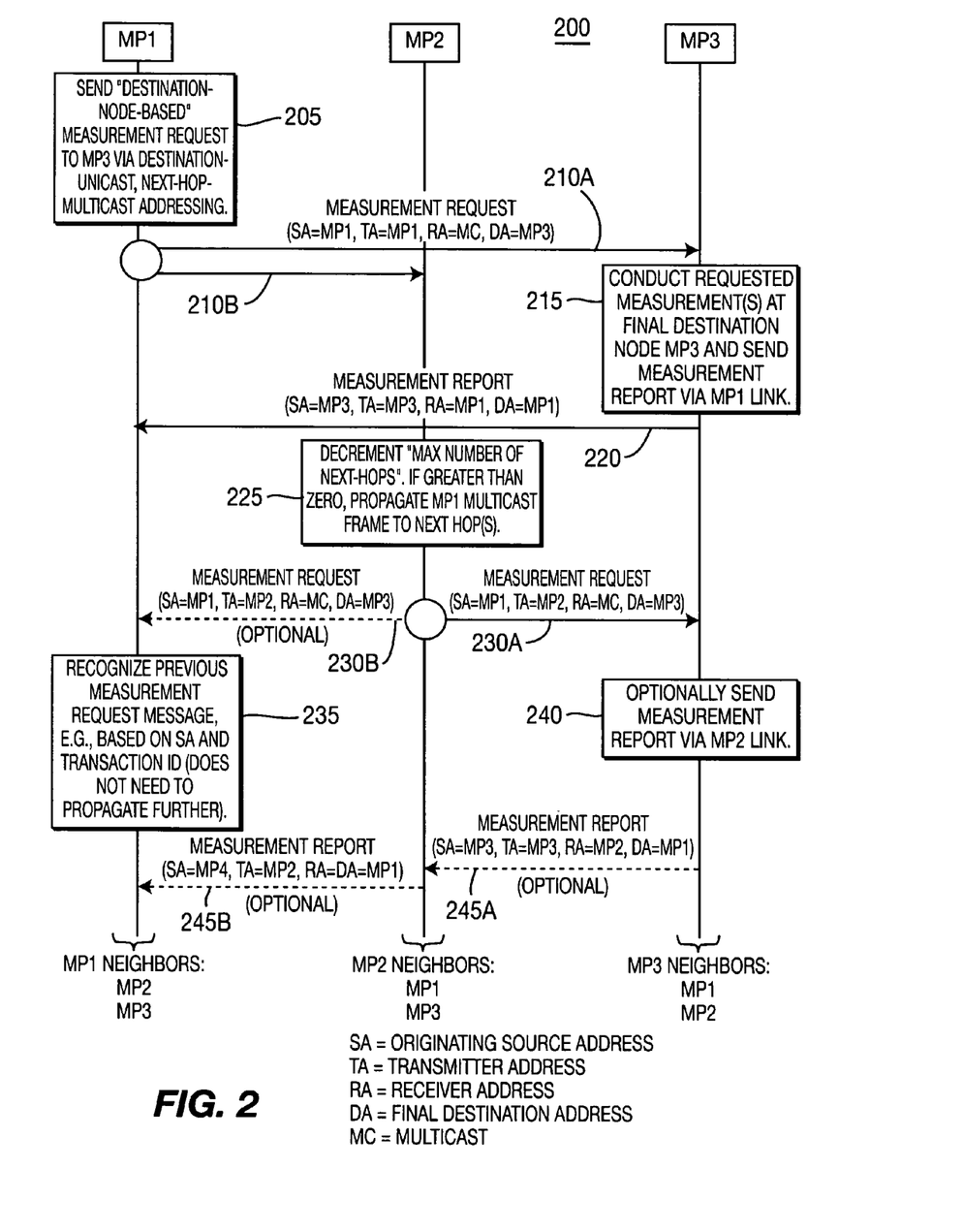
FIG. 2 is a signal flow diagram illustrating the destination-node-based measurements including destination-unicast/next-hop-multicast/broadcast.

FIGS. 1 and 2 are signal flow diagrams of inter-MP signaling in accordance with the present invention, where "SA" represents the originating source address, "TA" represents the transmitter address, "RA" represents the receiver address, and "DA" represents the final destination address. FIG. 1 illustrates the mechanism for destination-node-based measurements using destination-unicast/next-hop-unicast addressing. FIG. 2 illustrates the mechanism for destination-node-based measurements for destination-unicast/next-hop-multicast/broadcast.

Next-Hop-Unicast Addressing

FIG. 1 shows an exemplary communication system 100 including a plurality of nodes in accordance with one embodiment of the present invention. The communication system 100 may be a mesh network including a plurality of MPs including MP1, MP2, MP3 and MP4. MP1 serves as a source node, MP2 and MP3 serve as intermediate nodes, and MP4 serves as a final destination node.

As shown in FIG. 1, the source node, MP1 sends a "destination-node-based" measurement request message to MP4 using destination-unicast/next-hop-unicast addressing (step 105) and MP1 sends the measurement request message towards MP4 via MP2, MP4 being the destination address and MP2 being the next-hop address of the measurement request message (step 110). When MP2 receives the destination-node-based measurement request message, MP2 determines the next-hop towards MP4 (step 115) and MP2 forwards the destination-node-based measurement request message to the next-hop, (i.e., MP3), (step 120). When MP3 receives the destination-node-based measurement request message, MP3 determines the next-hop towards MP4 (step 125) and MP3 forwards the destination-node-based measurement request message to the next-hop, (i.e., MP4) (step 130). When the final destination node, MP4, receives the destination-node-based measurement request message, MP4 conducts measurements if measurement results are not available (step 135) and then sends a measurement report message back to MP1 (step 140) through MP3, MP1 being the destination address and MP3 being the next-hop address of the measurement report. When MP3 receives the measurement report message it determines the next-hop towards MP1 (step 145) and MP3 forwards the measurement report message to the next-hop (i.e. MP2) (step 150). When MP2 receives the measurement report message it determines the next-hop towards MP1 (step 155) and forwards the measurement report message to the original source of the measurement request (i.e., MP1) (step 160). All of these messages are sent using unicast messages.

Next-Hop-Multicast/Broadcast Addressing

In another embodiment, the "maximum number of next-hop addresses" may be used to reduce proliferation of the next-hop-multicast/broadcast frames. Logic within the MPs may also be used to reduce congestion by suppressing the forwarding of subsequent multicast/broadcast requests based on recognizing the originating source address and transaction identifier of the original measurement request.

In the case of receiving measurement requests from multiple next-hop transmissions, the destination node may send the report back to the source via one or all links from which the measurement request was received, depending on how the measurement report was specified.

Mechanisms for reducing signaling overhead and proliferation of multicast messages related to measurement requests/reports can be imposed. As shown in FIG. 2, the dotted-line signaling is meant to indicate that these messages are and can be removed in the case when an MP receives a message but does not forward it again to the transmitter of the message. For example, although MP1 is considered as a next-hop neighbor of MP2, MP2 will not forward the message back to MP1 since MP2 just received it from MP1. Furthermore, when an MP receives a message twice from two different MPs, the MP will forward only one message to its next-hop neighbors.

FIG. 2 shows an exemplary communication system 200 including a plurality of nodes in accordance with one embodiment of the present invention. The communication system 200 may be a mesh network including a plurality of MPs including MP1, MP2 and MP3. MP1 serves as a source node, MP2 serves as intermediate node and MP3 serves as a final destination node.

As shown in FIG. 2, MP1 sends a "destination-node-based" measurement request message to MP3 using destination-unicast/next-hop-multicast addressing (step 205). MP1 multicasts the measurement request message wherein it is directly received by both MP3 (step 210A) and MP2 (step 210B). When MP3 receives the measurement request message, MP3 recognizes itself as the final destination, conducts the requested measurement(s) if measurement results are not available (step 215), and then sends a measurement report message back to MP1 (step 220). When MP2 receives the measurement request message, MP2 determines that it is not the final destination and decrements the "maximum number of next-hops" to determine if it should continue to propagate the message via next-hop-multicasting (step 225). If the "maximum number of next-hops" is greater than zero, MP2 sends the measurement request message via next-hop-multicasting where it is received by MP3 (step 230A) and, optionally, MP1 (step 230B). Optionally, the forwarding scheme of MP2 ensures that MP2 does not send the measurement request message back to MP1 since MP2 received it from MP1. In any case, if MP1 receives the measurement request message, MP1 recognizes from the source address and transaction identifier that the measurement request message is a copy of an ongoing transaction and suppresses any further multicasting of the message (step 235). When MP3 receives the forwarded version of the measurement request via MP2, it optionally sends the corresponding measurement report message via MP2 (step 240) if so requested. When MP2 receives the measurement report message (step 245A), MP2 forwards it back to MP1 (step 245B).

As shown in FIG. 2, the same destination node, (e.g. MP3), can receive different versions of the same measurement request when next-hop-multicast or broadcast is used. Similarly, a source (e.g. MP1) can receive multiple measurement reports associated to the same measurement request, (i.e., same transaction ID), when next-hop-multicast or broadcast are used. It should be noted that this behavior might be desired in the context where the source node wants to probe the system to get insights about the performance associated to different routes. In that context, each version of the measurement request and measurement reports would have a distinct identifier. In the preferred implementation, this unique identifier would be a route identifier that would consist in the concatenation of node identifiers used to carry the packet from the source to the destination and optionally, back to the source. In the preferred implementation, each node involved in forwarding the packet would append its node identifier to the route ID such that the route identifier would build itself.

The present invention includes a method by which MPs request, report and collect multi-hop measurements along single and multiple MP routes. In this case, the MP requires measurements from all of the nodes up to a specific destination point. In this method, the next-hop and destination address can be specified as unicast, multicast or broadcast.

In mesh networks, an MP can require route-based measurements from multiple MPs in multi-hops in a single mesh route. All of the MPs in the route from the source AP to the destination MP will be required to send the measurements back to the source node. Optionally, intermediate nodes can look at and use the measurements of other MPs on this route as well.

Figure 3:
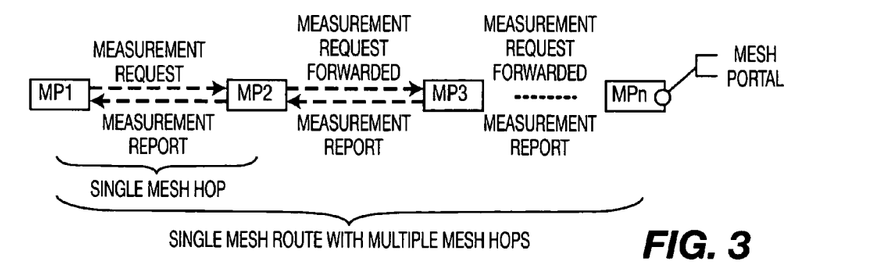
FIG. 3 is a signal flow diagram illustrating multi-hop measurements along a single mesh route.

FIG. 3 shows an exemplary communication system 300 including a plurality of nodes in accordance with one embodiment of the present invention. The communication system 300 may be a mesh network including a plurality of MPs including MP1, MP2, MP3, . . . , MPn. MP1 serves as a source node, MP2 and MP3 serve as intermediate nodes, and MPn serves as a final destination node. As shown in FIG. 3, the source node, MP1, will send a multi-hop measurement request message to a final destination MP, MPn, over a route, (i.e., a mesh route), including one or more intermediate nodes, MP2, MP3. Based on the multi-hop measurement request measurement, all of the nodes in the route will report the requested measurements back to the source MP, MP1, via measurement report messages. Upon receipt of the measurement report messages, the source MP, MP1, will collect the measurement information. MP1, MP2, MP3, . . . , MPn belong to the same route. The source MP can request measurements from one or multiple MP(s) in the route. Optionally, intermediate nodes can look at and use the measurements of other MPs on this route as well.

Figure 4:
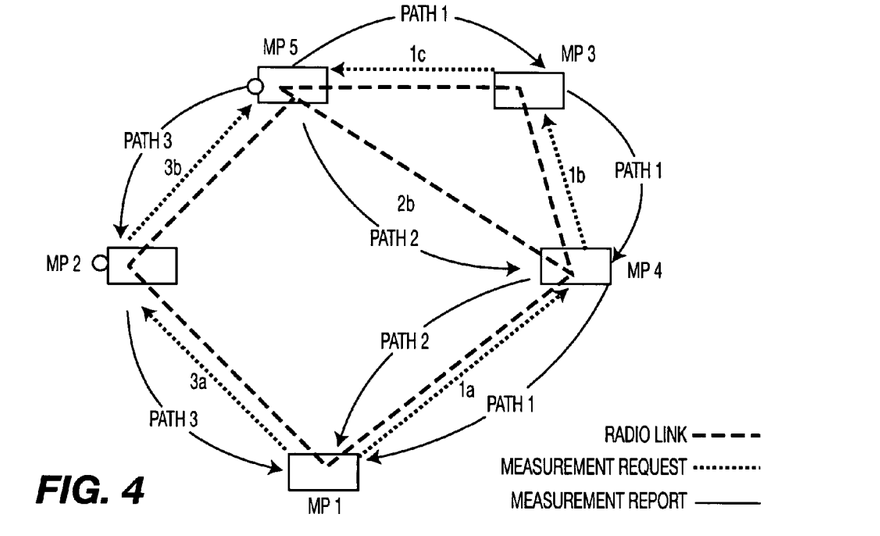
FIG. 4 is a signal flow diagram illustrating multi-hop measurements along multiple routes.

FIG. 4 illustrates multiple mesh routes, whereby a source node, MP1, sends a route-based multi-hop measurement request message to one specific destination node, MP5 through a plurality of nodes MP2, MP3, MP4, MP5. In this scenario, MP1 sends measurement request messages 1a, 3a, that will be sent on a plurality of routes to MP5. When MP4 receives the measurement request message 1a, it checks the next-hop and destination address and forwards the measurements request messages 1b, 2b, to MP3 and MP5, respectively. When MP2 receives the measurement request message 3a, it checks the next-hop and destination address and forwards the measurement request messages 3b to MP5. When MP3 receives the measurement request message 1b, it checks the next-hop and destination address and forwards the measurement request message 1c to MP5.

In case the flow ID is defined, each MP has the option to forward the message on the specified flow ID only. When the destination node, MP5, receives the measurement request messages 1c, 2b and 3b, it responds with a measurement report message sent over paths 1, 2 and 3 that contains its own measurement and measurements of the nodes MP2, MP3 and MP4. If the goal of the initial route-based multi-hop measurement request was just to discover the route, (this can be indicated through the use of a flag in the message request), each node can forward the measurement report packet after adding its own address instead of adding the requested measurement. Also, these messages can be used as a probe to measure the end-to-end delay on a specific path, (e.g., via time stamping the packets). The same concept can be applied in case of a centralized architecture, where a centralized point asks for reporting specific measurement from all points on all of the routes between a source and a destination node. The measurement request message can specify that each of the MPs on a specific route including MPn has to report its measurement results back to the source MP.

The present invention includes few transport mechanisms and options to report measurements. The concepts which can be applied to measurement reporting options include having the measurement request message ask for one or more than one measurement in a single message. In this option, each destination MP sends its measurement reports to the source MP. This will allow a faster response to the measurement request message. However, it will result in increasing signaling overhead.

Figure 5:
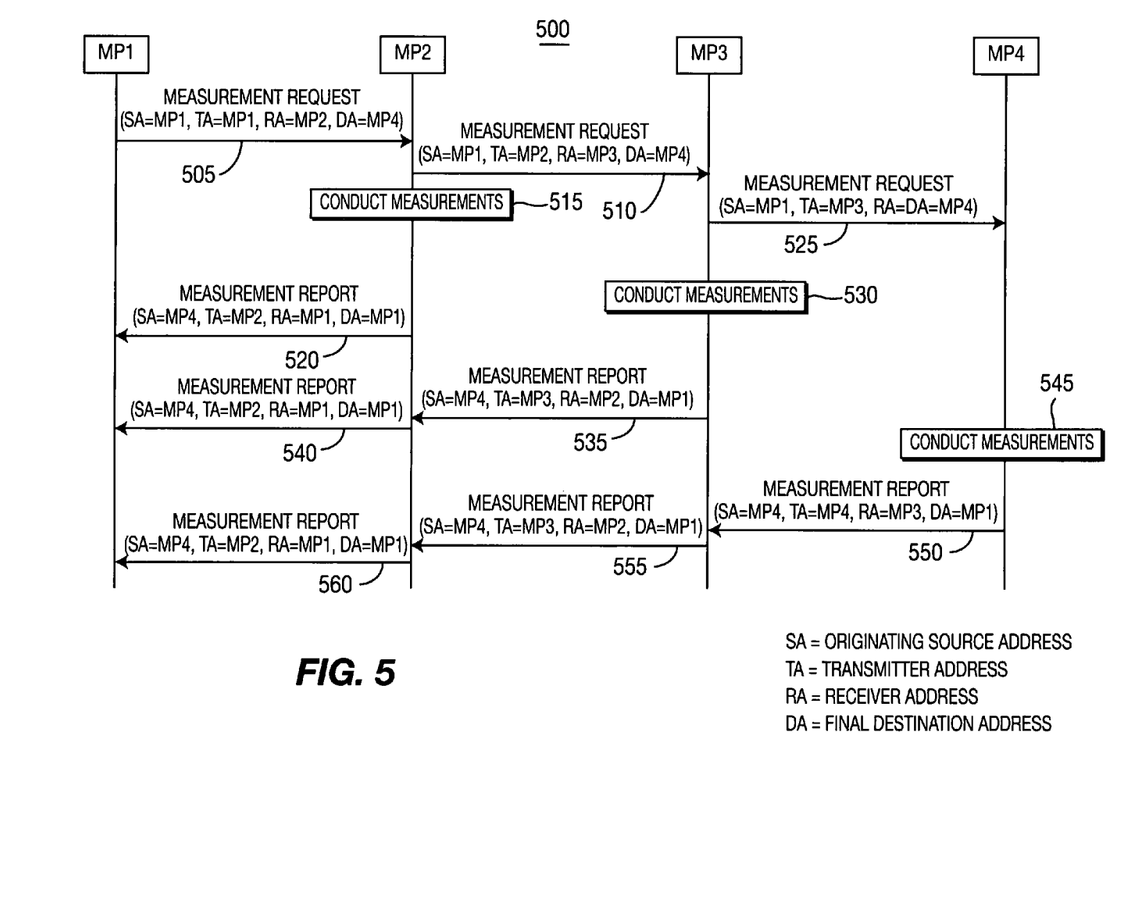
FIG. 5 is a signal flow diagram illustrating destination MP report measurements being sent to a source MP in accordance with one embodiment of the present invention.

FIG. 5 shows an exemplary communication system 500 including a plurality of nodes in accordance with one embodiment of the present invention. The communication system 500 may be a mesh network including a plurality of MPs including MP1, MP2, MP3 and MP4. MP1 serves as a source node, MP2 and MP3 serve as intermediate nodes, and MP4 serves as a final destination node. As shown in FIG. 5, the source node, MP1, sends a measurement request message to MP2 (step 505). When MP2 receives the measurement request message, MP2 forwards the measurement request message to the next-hop, (i.e., MP3), (step 510), conducts measurements if measurement results are not available (step 515) and then sends a measurement report message back to MP1 (step 520). When MP3 receives the measurement request message, MP3 forwards the measurement request message to the next-hop, (i.e., MP4), (step 525), conducts measurements if measurement results are not available (step 530) and then sends a measurement report message with a destination address of MP1. That measurement report is received by MP2 (step 535) which then forwards to its final destination MP1 (step 540). When the final destination node, MP4, receives the measurement request message, MP4 conducts measurements if measurement results are not available (step 545) and then sends a measurement report message with a destination address of MP1. That measurement report is first received by MP3 (step 550) which then forwards the measurement report to MP2 (step 555) which forwards it to its final destination: MP1 (step 560). Thus, each MP, including the final destination node, MP4, sends its own measurement report message to the source MP, MP1, without waiting for a response from next-hop MPs.

The concepts which can be applied to measurement reporting options include having the measurement request message ask for measurements once, periodical measurement reporting or threshold based measurement reporting. In this option, there is one to one correspondence between a measurement request message and a measurement report message. However, the measurement request message can be sent once to configure the measurements and each of the MPs will know when to report back its own measurements as per the measurement reporting criteria in the measurement request message. Accordingly, when measurements are conducted in steps 515, 530 and 545, the measurement results are incorporated in the measurement report message, (i.e., the results are already available), or the measurements are performed and then they are incorporated into the measurement report message. Each destination MP in the measurement request path gathers measurement reports and combines them to form one synthetic report. This approach minimizes the signaling overhead as compared to the first option. However, this approach is disadvantageous because it increases delay at each node and the measurement report message must go back to the source node, MP1, via the same route.

Figure 6:
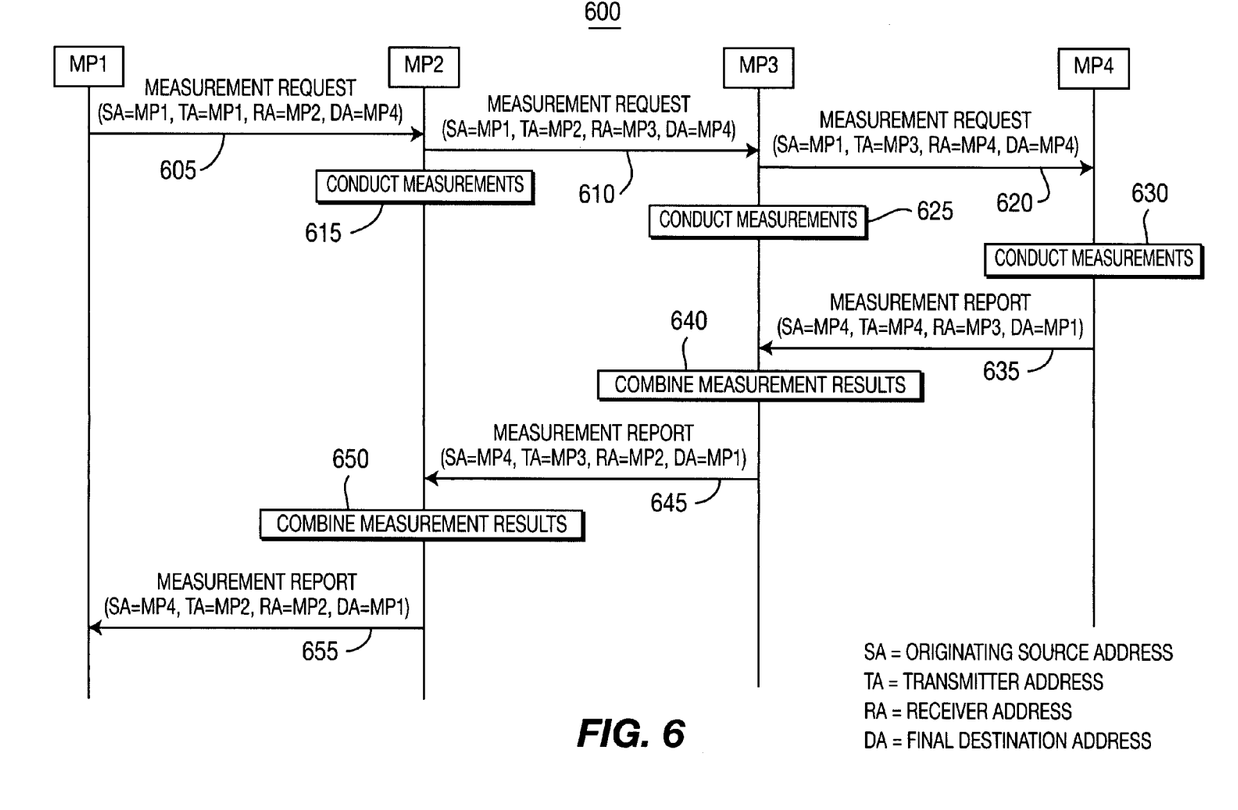
FIG. 6 is a signal flow diagram which shows measurement reports synthesized by each MP in accordance with another embodiment of the present invention.

FIG. 6 shows an exemplary communication system 600 including a plurality of nodes in accordance with one embodiment of the present invention. The communication system 600 may be a mesh network including a plurality of MPs including MP1, MP2, MP3 and MP4. MP1 serves as a source node, MP2 and MP3 serve as intermediate nodes, and MP4 serves as a final destination node. As shown in FIG. 6, MP1 sends a measurement request message to MP2 (step 605). When MP2 receives the measurement request message, MP2 forwards the measurement request message to MP3 (step 610) and conducts measurements (step 615). When MP3 receives the measurement request message, MP3 forwards the measurement request message to MP4 (step 620) and conducts measurements (step 625). When the measurement request message is received at the destination MP, MP4, the destination MP will conduct measurements (step 630) and send back a measurement report message including its own measurements (step 635). On the way back to the source node, MP1, intermediate MPs, MP2 and MP3, will piggyback, (i.e., combine), their own measurements on the measurement report message and send it back to the source MP, MP1 (steps 640, 645, 650, 655).

The concepts which can be applied to measurement reporting options include having MPs send back a measurement report message or it can piggyback the report on other data, control or management frame. Each destination will put together its own measurement in the measurement request message before it forwards it to the next MP up to the final destination node.

When the final destination node receives the measurement request message, it will send its own measurements plus all other nodes measurements in the measurement report message. This approach reduces the signaling overhead compared to option 1, and unlike option 2, allows the measurement report message to be sent through different path than the measurement request message. However, there is still a bit processing overhead at the interim node.

Figure 7:
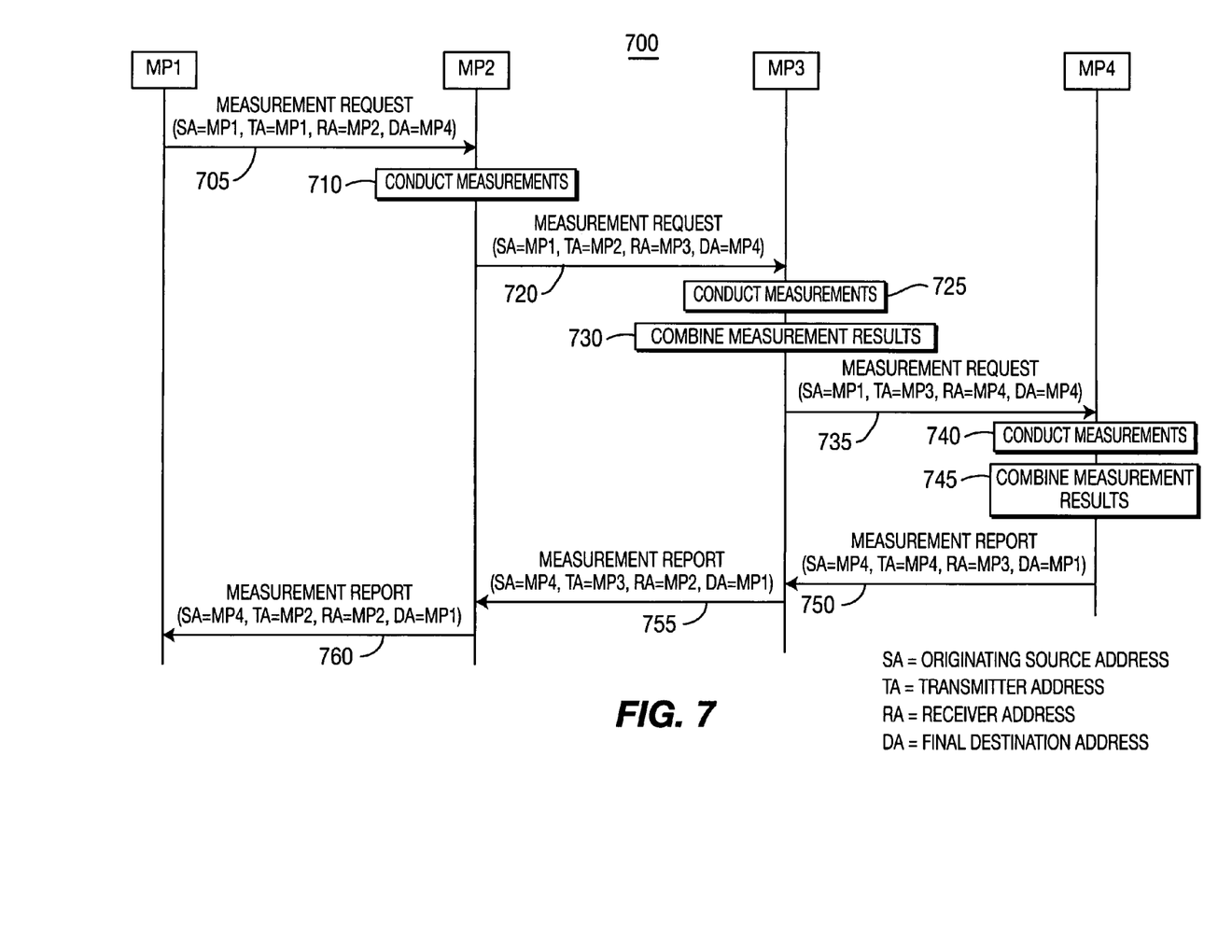
FIG. 7 is a signal flow diagram which shows measurement reports synthesized by a final destination MP in accordance with yet another embodiment of the present invention.

FIG. 7 shows an exemplary communication system 700 including a plurality of nodes in accordance with one embodiment of the present invention. The communication system 700 may be a mesh network including a plurality of MPs including MP1, MP2, MP3 and MP4. MP1 serves as a source node, MP2 and MP3 serve as intermediate nodes, and MP4 serves as a final destination node. As shown in FIG. 7, MP1 sends a measurement request message to MP2 (step 705). When MP2 receives the measurement request message, MP2 conducts measurements (step 710), and attaches the measurement results to a measurement request message which is forwarded to MP3 (step 720). Each intermediate node, MP2, MP3 on the route piggybacks its measurement on the measurement request message until it arrives at the final destination, MP4 (steps 710, 720 725, 730, 735). The final destination node, MP4, conducts measurements (step 740) combines its measurements with all of the received measurements into a measurement report message, which is sent back to the source node, MP1, via the intermediate nodes, MP2 and MP3 (steps, 745, 750, 755 and 760).

Figure 8:
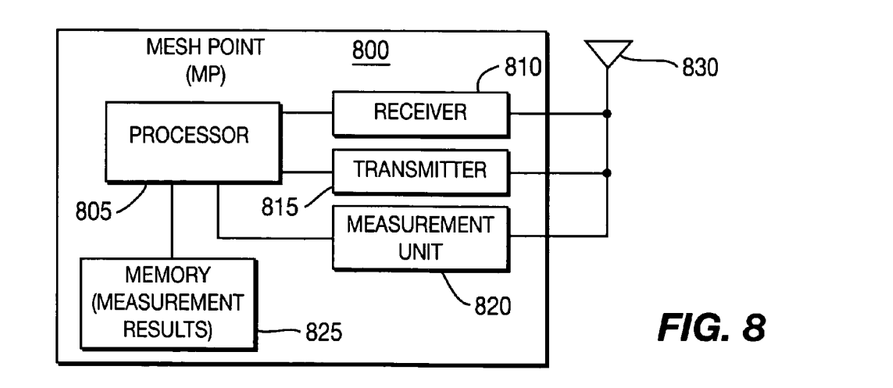
FIG. 8 shows an exemplary block diagram of an MP configured to implement the various embodiments of the present invention.

FIG. 8 shows an exemplary block diagram of an MP 800 configured to implement the various embodiments of the present invention. The MP 800 may be configured as a wireless MP, as shown in FIG. 8, or a wired MP. The MP 800 includes a processor 805, a receiver 810, a transmitter 815, a measurement unit 820, a memory 825 for storing measurement results and an antenna 830. The processor 805, the receiver 810, the transmitter 815, the measurement unit 820 and the memory 825 may be incorporated in an IC.

In one embodiment when the MP 800 is used in the system 500 of FIG. 5, the receiver 810 receives a measurement request, (if the MP 800 is not a source MP that originated the measurement request, such as MP1 in the system 500 of FIG. 5). In response to receiving the measurement request, the transmitter 815 forwards the measurement request to a next-hop MP, (if the MP is not a final destination MP, such as MP4 in the system 500 of FIG. 5), and the measurement unit 820 conducts measurements, if measurement results are not already available in the memory 825. Examples of these measurements include, but are not limited to, channel load, noise histogram, signal to noise ratio (SNR), receiver power indicators, or the like. The measurement unit 820 or the memory 825 provides the measurement results to the processor 805, which generates a measurement report which is sent, via the transmitter 815 and the antenna 830, to the source MP that originated the measurement request.

In another embodiment when the MP 800 is used in the system 600 of FIG. 6, the receiver 810 receives a measurement request, (if the MP 800 is not a source MP that originated the measurement request, such as MP1 in the system 600 of FIG. 6). In response to receiving the measurement request, the transmitter 815 forwards the measurement request to a next-hop MP, (if the MP is not a final destination MP, such as MP4 in the system 600 of FIG. 6), and the measurement unit 820 conducts measurements, if measurement results are not already available in the memory 825, and stores the measurement results in the memory 825. However, in this embodiment, the MP 800 does not generate a measurement report unless it is the final destination MP, (such as MP4 in the system 600 of FIG. 6). Instead, the MP 800 waits to receive a measurement report from the next-hop MP and, when the receiver 810 receives the measurement report, the processor 805 combines the measurement results of the MP 800 stored in the memory 825 with the measurement results included in the measurement report. The processor 805 then generates a combined measurement report which includes the combined measurement results and sends, via the transmitter 815 and antenna 830, the combined measurement report to the previous-hop MP, which may or may not be the source MP. If the previous-hop MP is not the source MP, the previous-hop will further combine its measurement results with the combined measurement results, and generate a new combined measurement report, and so on until the source MP receives a multi-combined measurement report.

In yet another embodiment when the MP 800 is used in the system 700 of FIG. 7, the receiver 810 receives a measurement request, (if the MP 800 is not a source MP that originated the measurement request, such as MP1 in the system 700 of FIG. 7). However, in this embodiment, the MP 800 does not immediately forward the measurement request to a next-hop MP in response to receiving the measurement request. Instead, the measurement unit 820 conducts measurements, if measurement results are not already available in the memory 825, and the processor 805 combines the measurement results any measurement results already included in the measurement request and generates a new measurement request including the combined measurement results. The MP 800 forwards the measurement request including the combined measurement results to a next-hop MP, (if the MP is not a final destination MP, such as MP4 in the system 700 of FIG. 7). Once the final destination MP receives the measurement request including the combined measurement results from the intermediate MPs, the final destination MP conducts measurements and generates a combined measurement report which is forwarded back to the source MP via the intermediate MPs without further processing.

Although the features and elements of the present invention are described in the preferred embodiments in particular combinations, each feature or element can be used alone without the other features and elements, or in various other combinations with or without other features and elements of the present invention.

What is claimed is:

1. A method of transmitting a message in a wireless mesh network, the method comprising:

receiving a message from a first wireless mesh point (MWP), that includes a source address of the first WMP, a destination address of a second WMP, a receiver address field that includes a first receiver address, a transmitter address field that includes a first transmitter address of the first WMP, and a value equal to the maximum number of next-hop addresses field;

updating the message by decrementing the value equal to the maximum number of next-hop addresses, by updating the receiver address field in the message with a second receiver address, and by updating the transmitter address field in the message with the first receiver address; and transmitting the updated message to the second WMP.

2. The method of claim 1 wherein the message further comprises a destination count field, that includes a number of destinations contained in the message.

3. The method of claim 1 wherein the updated message is transmitted to at least one other intermediate node.

4. The method of claim 1 wherein the destination address is a media access control (MAC) address.

5. A method of forwarding a message in a wireless mesh network, the method comprising:

receiving, at an intermediate node, a message from a first wireless mesh point (WMP), that includes a source address of the first WMP, a destination address of a second WMP, a receiver address field that includes a first receiver address, a transmitter address field that includes a first transmitter address of the first WMP, and a value equal to the maximum number of next-hop addresses field;

updating the message by decrementing the value equal to the maximum number of next-hop addresses, by determining a second receiver address, by updating the receiver address field in the message with the second receiver address, and by updating the transmitter address field in the message with the first receiver address; and forwarding the updated message to the second WMP.

6. The method of claim 5, further comprising:

transmitting the updated message to at least one other intermediate node.

7. A wireless mesh point (WMP), the WMP comprising:

a receiver configured to receive a message from a first WMP, that includes a source address of the first WMP, a destination address of a second WMP, a receiver address field that includes a first receiver address, a transmitter address field that includes a first transmitter address of the first WMP, and a value equal to the maximum number of next-hop addresses field;

a processor configured to update the message by decrementing the value equal to the maximum number of next-hop addresses, updating the receiver address field in the message with a second receiver address, and updating the transmitter address field in the message with the first receiver address; and a transmitter configured to transmit the updated message to the second WMP.

8. The MP of claim 7 wherein the message further includes a destination count field that includes a number of destinations contained in the message.

9. The MP of claim 7 wherein the transmitter is further configured to transmit the updated message to an intermediate node.

10. The MP of claim 7 wherein the destination address is a media access control (MAC) address.

11. A wireless mesh point (WMP), the WMP comprising:

a receiver configured to receive a message from a first WMP, that includes a source address of the first WMP, a destination address of a second WMP, a receiver address field that includes a first receiver address, a transmitter address field that includes a first transmitter address of the first WMP, and a value equal to the maximum number of next-hop addresses field;

a processor configured to update the message by decrementing the value of the maximum number of next-hop address, by determining a second receiver address, by updating the receiver address field in the message with the second receiver address, and by updating the transmitter address field in the message with the first receiver address; and a transmitter configured to forward the updated message to the second WMP.

12. The MP of claim 11 wherein the transmitter is further configured to transmit the updated message to at least one other intermediate node.

* * * * *